United States Patent
Von Vopelius-Feldt et al.

(10) Patent No.: US 10,156,285 B2
(45) Date of Patent: Dec. 18, 2018

(54) TENSIONING RAIL WITH WEAR PROTECTION ELEMENT

(71) Applicant: iwis motorsysteme GmbH & Co. KG, Munich (DE)

(72) Inventors: Phillipp Von Vopelius-Feldt, Kiefersfelden (DE); Franz Stiglmaier, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 480 days.

(21) Appl. No.: 14/880,829

(22) Filed: Oct. 12, 2015

(65) Prior Publication Data

US 2016/0102738 A1    Apr. 14, 2016

(30) Foreign Application Priority Data

Oct. 14, 2014    (DE) .......................... 10 2014 015 156

(51) Int. Cl.
*F16H 7/08*    (2006.01)
*F16H 7/06*    (2006.01)

(52) U.S. Cl.
CPC ............. *F16H 7/08* (2013.01); *F16H 7/06* (2013.01); *F16H 2007/0804* (2013.01); *F16H 2007/0842* (2013.01); *F16H 2007/0872* (2013.01); *F16H 2007/0893* (2013.01)

(58) Field of Classification Search
CPC ....... F16H 7/08; F16H 7/06; F16H 2007/0842
USPC .......................................................... 474/111
See application file for complete search history.

(56) References Cited

U.S. PATENT DOCUMENTS

| | | | | |
|---|---|---|---|---|
| 5,266,066 | A * | 11/1993 | White | F16H 7/08 474/111 |
| 6,428,435 | B1 * | 8/2002 | Kumakura | F16H 7/08 474/111 |
| 2002/0107096 | A1 * | 8/2002 | Tsuruta | F16H 7/08 474/111 |
| 2003/0125144 | A1 * | 7/2003 | Horikawa | F16H 7/08 474/111 |

(Continued)

FOREIGN PATENT DOCUMENTS

| | | |
|---|---|---|
| CN | 101415968 A | 4/2009 |
| CN | 201992014 U | 9/2011 |

(Continued)

OTHER PUBLICATIONS

Office Action in Chinese Patent Application No. 201510668678.1, dated Aug. 2, 2017.

*Primary Examiner* — Michael R Mansen
*Assistant Examiner* — Mark K Buse
(74) *Attorney, Agent, or Firm* — Baker & Hostetler LLP

(57) ABSTRACT

A tensioning rail for a drive chain, in particular for a chain drive of an internal combustion engine, comprises a basic body and a spring unit, the basic body including a sliding surface for contact with the drive chain and a press-on surface. The spring unit comprises a tensioning end arranged on the press-on surface and a support end supportable on a counter bearing, a wear protection element being provided, which is arranged at the support end of the spring unit. In addition, the invention relates to a chain drive including such a tensioning rail as well as to the use of such a tensioning rail for a chain drive of an internal combustion engine.

15 Claims, 6 Drawing Sheets

(56) References Cited

U.S. PATENT DOCUMENTS

| | | | | |
|---|---|---|---|---|
| 2003/0162615 A1* | 8/2003 | Yonezawa | ............... | F16H 7/08 474/111 |
| 2004/0132570 A1* | 7/2004 | Takeda | ............... | F16H 7/08 474/111 |
| 2006/0025256 A1* | 2/2006 | Wake | ............... | F16H 7/08 474/111 |
| 2006/0223661 A1* | 10/2006 | Haesloop | ............... | F16H 7/0831 474/111 |
| 2009/0105022 A1* | 4/2009 | Cantatore | ............... | F16H 7/08 474/111 |
| 2009/0163311 A1* | 6/2009 | Haesloop | ............... | A61K 38/40 474/111 |
| 2010/0210384 A1* | 8/2010 | Young | ............... | F16H 7/08 474/111 |
| 2012/0035010 A1* | 2/2012 | Young | ............... | F16H 7/08 474/111 |
| 2014/0162819 A1* | 6/2014 | Young | ............... | F16H 7/08 474/111 |
| 2014/0171244 A1* | 6/2014 | Hartmann | ............... | F16H 7/08 474/111 |

FOREIGN PATENT DOCUMENTS

| | | |
|---|---|---|
| CN | 103148183 A | 6/2013 |
| CN | 103206498 A | 7/2013 |
| DE | 43 27 314 A1 | 2/1994 |
| DE | 44 37 926 C1 | 2/1996 |
| DE | 100 143 33 A1 | 3/2001 |
| DE | 10 2004 014 486 A1 | 10/2005 |
| DE | 202007002854 U1 | 7/2008 |
| EP | 1 070 875 A2 | 1/2001 |
| WO | 2014/026776 A1 | 2/2014 |

* cited by examiner

TENSIONING RAIL WITH WEAR PROTECTION ELEMENT

CROSS-REFERENCE TO RELATED APPLICATION

This application claims priority to foreign German patent application No. DE 10 2014 015 156.5, filed on Oct. 14, 2014, the disclosure of which is incorporated by reference in its entirety.

FIELD OF THE INVENTION

The present invention relates to a tensioning rail for a drive chain, in particular for a chain drive of an internal combustion engine, comprising a basic body and a spring unit, the basic body including a sliding surface for contact with the drive chain and a press-on surface, wherein the spring unit comprises a tensioning end arranged on the press-on surface and a support end supportable on a counter bearing. In addition, the present invention relates to a chain drive including such a tensioning rail as well as to the use of such a tensioning rail for a chain drive of an internal combustion engine.

BACKGROUND

Tensioning rails are used in large numbers for various applications in internal combustion engines, both for the timing chain drive of the engine and for driving auxiliary units, e.g. the oil pump. In the case of timing chain drives as well as auxiliary drives a tensioning rail can hold the drive chain at a defined tension and compensate the elongation of the chain occurring due to manufacturing tolerances and wear. Tensioning rails are normally pivotably supported on a bearing pin provided at a bearing point that is fixedly connected to the engine block, and they are pretensioned against the drive chain via an actively operated tensioning device or a passively acting spring unit.

DE 100 143 33 A1 discloses a tensioning rail for a chain drive, in the case of which a torsion coil spring is arranged, in the area of its coiled portion, around a sleevelike pivot of the tensioning rail. Whereas one end of the coil spring rests in a hole of the engine block, the other end of the tensioning rail presses against the drive chain. Another tensioning rail pretensioned by means of a torsion coil spring is known from DE 44 37 926 C1, the tensioning rail of the auxiliary drive being here supported on a guide rail of the associated main drive. DE 43 27 314 A1, however, describes a chain tensioner with a leaf spring supported at one end thereof, the leaf spring being provided with a sliding body and being under a constant pretension with respect to the drive chain. Reference DE 10 2004 014 486 A1 shows again a pivotably supported tensioning rail with a torsion coil spring arranged on the bearing pin, said torsion coil spring resting on a counter bearing, which is fixedly arranged relative to the bearing pin, so as to press the tensioning rail against the drive chain.

Modern internal combustion engines comprise an increasing number of units to be driven, the installation space available for the engine remaining the same or getting even smaller. In addition, modern engines get more and more complex so as to fulfil the stricter statutory provisions with respect to exhaust gas emission and fuel consumption.

The increasing number of auxiliary units, in combination with the higher complexity of the internal combustion engines, leads to a reduction of the possibilities of arranging necessary drives as well as tensioning and guide rails associated therewith. It follows that, for installing pivotably supported tensioning rails, complicated or unusual structural designs are sometimes necessary, which often entail new problems with respect to wear resistance and operational reliability.

Although many of the prior art tensioning devices based on the use of tensioning rails proved to be very useful, it is, especially due to the strong competition in the field of automotive industry, continuously endeavored to optimize tensioning rails and their incorporation into engine constructions that get more and more complicated. In addition, tensioning rails are mass-produced articles for the automotive industry, which, with respect to the high number of pieces and the progressive innovation in this field, continuously underlie the necessity to replace the constructions used by simpler and less expensive concepts.

It is therefore the object of the present invention to provide a tensioning rail, which, avoiding the drawbacks of known constructions, can be manufactured and mounted at a reasonable price and is easy to use in spite of the increased complexity of modern engine constructions.

SUMMARY OF THE INVENTION

According to the present invention, this object is achieved in that a wear protection element is provided, said wear protection element being arranged at the support end of the spring unit. Such a separate wear protection element arranged between the support end of the spring unit and the counter bearing reduces the wear at the spring unit and the counter bearing, respectively, thus allowing a "downsizing" of the chain drive or its components as well as of the amount of material used. Depending on the intensity and the duration of the load acting on a chain drive, significant wear, which may even cause a failure of the tensioning rail and, consequently, of the chain drive, may occur in particular in the area of contact between the spring unit and a counter bearing. The provision of a wear protection element at the support end of the spring unit can prevent this kind of wear problems. Since the tensioning end of the spring unit is normally arranged on the press-on surface of the basic body of the tensioning rail with a certain amount of clearance, the spring unit being tensioned via a freely movable deflection portion between the tensioning end and the support end, normally in the area of the pivot bearing, a comparatively small area of contact with the counter bearing is formed at the support end, said area of contact being subjected to comparatively high frictional loads, especially if the spring unit and/or the counter bearing consist of metal or of a fiber-reinforced plastic material. The wear protection element of a tensioning rail according to the present invention allows not only a reduction of the coefficient of friction between the components at the support end but also an enlargement of the area of contact between the spring unit and the counter bearing. In addition to the simple embodiment of a tensioning rail according to the present invention comprising a basic body and a sliding surface, which is provided thereon and which contacts the drive chain, such a tensioning rail may also be formed of a support body and a separate sliding body arranged thereon and having a sliding surface for contact with the drive chain.

According to a preferred embodiment, the spring unit is configured as a leaf spring. A leaf spring allows broad contact between the tensioning end of the spring unit and the press-on surface of the basic body and also broad contact with the wear protection element at the support end of the spring unit. Alternatively, the spring unit may also be configured as a torsion coil spring and as a coiled spring wire, respectively.

For captively securing the spring unit on the tensioning rail, a locking element may be provided on the press-on surface of the basic body. The locking element holds the spring unit on the press-on surface. Depending on the respective structural design of the reception means on the spring unit, a relative movement between the press-on surface and the spring unit in the direction of the spring unit may be possible, notwithstanding that the spring unit is arranged on the press-on surface. For example, a round, slotted locking pin provided with detent projections may project from the press-on surface, said locking pin engaging a complementary reception means on the spring. An elongate shape of said reception means allows a relative movement between the spring unit and the press-on surface.

According to an advantageous embodiment, the wear protection element is made of a wear-resistant, low-friction plastic material. A wear protection element consisting of plastic material can easily be produced by injection molding, and by choosing a wear-resistant, low-friction plastic material, e.g. on the basis of a technical thermoplastic, a suitable wear protection element of a tensioning rail according to the present invention can be produced in a simple manner and at a reasonable price.

In order to enlarge the area of contact between the wear protection element and a counter bearing, the wear protection element may have a curved or semicircular contact surface. When the contact surface supporting the spring unit on a counter bearing is enlarged, the force acting in the area of contact and, consequently, also the frictional resistance and the wear occurring in the area of contact with the counter bearing will be reduced.

According to an expedient embodiment, the wear protection element may be provided with at least one locking element for arranging the wear protection element at the support end of the spring unit. Such locking elements provided on the wear protection element allow, via a captive mode of arrangement of the wear protection element, also a constant support of the spring unit on the counter bearing. In addition to pretensioned detent elements, which grip over the spring unit, also respective detent projections, pockets and openings cooperating with complementary reception means or projections of the spring unit may serve as locking elements for fixing the wear protection element.

According to another embodiment, the wear protection element is configured as a sleeve for arrangement on the counter bearing and for contact with the support end of the spring unit. When the wear protection element is configured as a sleeve and arranged on the counter bearing, it can easily be constructed and mounted, so as to arrange the wear protection element safely and rapidly on the support end of the spring unit.

In addition, fastening means may be provided on the support end of the spring unit. Such fastening means, which, with respect to the strength and the brittleness of the spring unit, are normally configured as simple openings, projections, notches or holes, allow the wear protection element to be reliably secured to the spring unit, in particular in combination with complementary locking elements on the wear protection element.

The present invention additionally relates to a chain drive, in particular an auxiliary chain drive of an internal combustion engine, comprising a drive gear and at least one driven gear, an articulated chain wrapped around the drive gear and the at least one driven gear, and a tensioning rail according to one of the above embodiments, which contacts the articulated chain. Such a chain drive allows, even in the case of long operating times and high loads, a reliable tensioning of the chain drive, e.g. of the drive of an oil pump or of an air conditioning system, without any risk of a wear-dependent failure of the tensioning rail and, consequently, of the chain drive in its entirety.

In addition, the present invention also relates to the use of a tensioning rail, which comprises a basic body and a spring unit, for a chain drive of an internal combustion engine, the spring unit comprising a tensioning end arranged on the press-on surface of the basic body and a support end supportable on a counter bearing, and a wear protection element being provided between the support end and the counter bearing during operation. When a tensioning rail according to the present invention is used, such a separate wear protection element provided between the support end and the counter bearing allows a low-wear reliable operation of a chain drive of the type in question and simultaneously an optimization of the respective chain drive.

BRIEF DESCRIPTION OF THE DRAWINGS

In the following, embodiments of the present invention will be explained in more detail making reference to drawings, in which.

DETAILED DESCRIPTION

Figure 1:
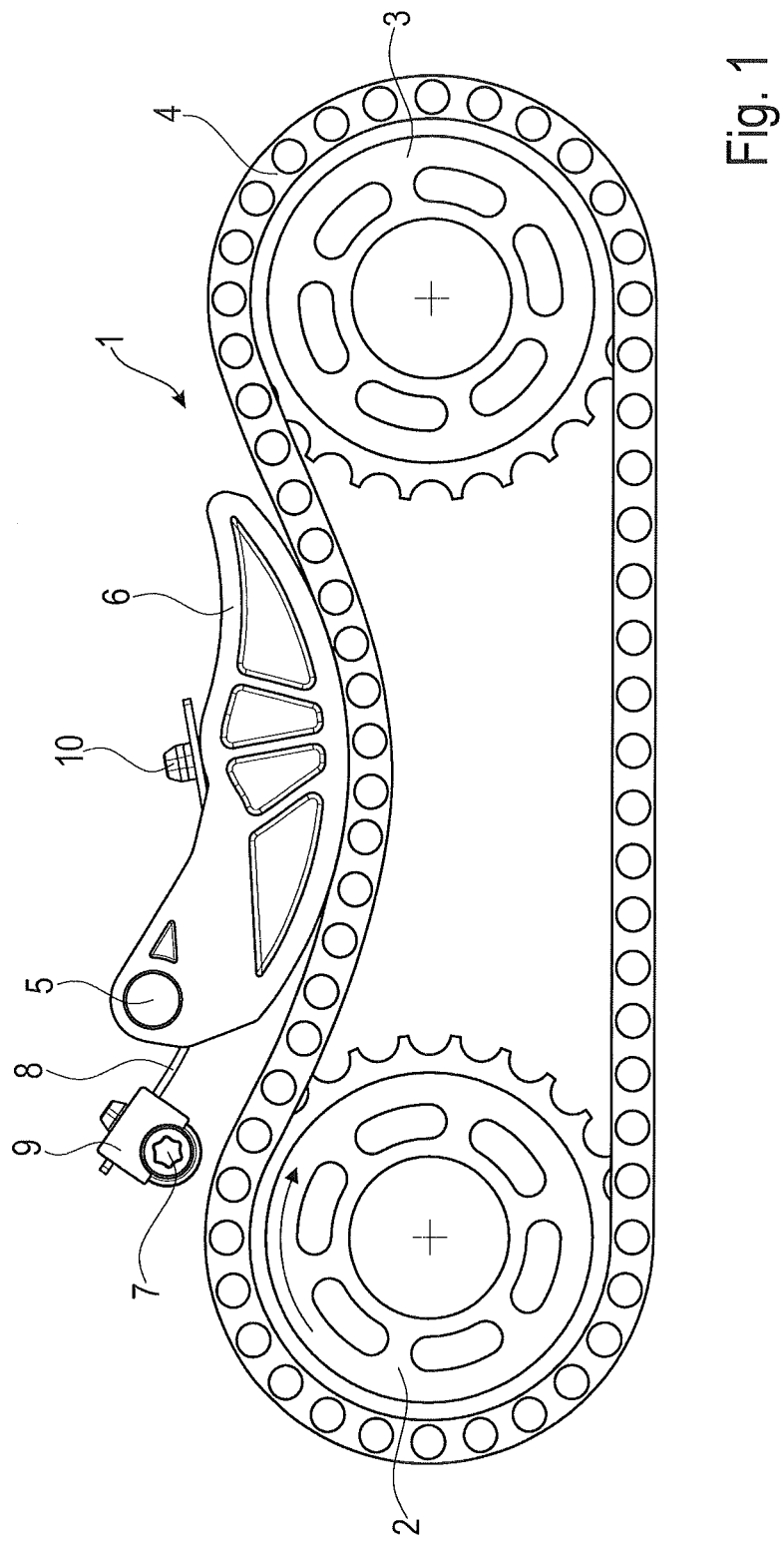
FIG. 1 shows a schematic view of a chain drive according to the present invention.

The chain drive 1 schematically shown in FIG. 1 and used for driving an auxiliary unit of an internal combustion engine, e.g. the oil pump or the compressor of the air conditioning system, comprises a driven gear 2 for connection to the auxiliary unit and a drive gear 3 for driving the chain drive 1, said drive gear 3 being coupled e.g. to the timing chain drive of the internal combustion engine. An endless drive chain 4 is wrapped around the driven gear 2 and the drive gear 3, and a tensioning rail 6 presses against the drive chain 4 in the slack span of the chain drive 1 between the driven gear 2 and the drive gear 3, said tensioning rail 6 being arranged such that it is pivotable about a bearing point 5. In the tight span of the chain drive 1, a guide rail may optionally be provided for guiding the drive chain 4. The tensioning rail 6 is pressed against the drive chain 4 by means of a spring unit 8 resting on a counter bearing 7. The counter bearing 7 and the spring unit 8 have arranged between them a wear protection element 9 preventing direct contact between the counter bearing 7 and the spring unit 8. The spring unit 8 is additionally connected to the tensioning rail 6 via a locking element 10.

Figure 2:
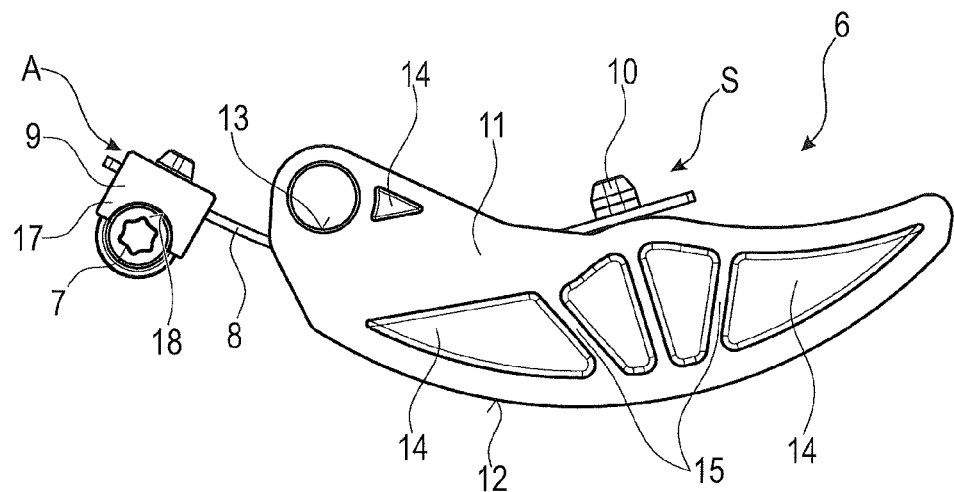
FIG. 2 shows an enlarged side view of the tensioning rail of FIG. 2 according to the present invention.

FIG. 2 shows an enlarged side view of the tensioning rail 6 according to the present invention, which is arranged in the chain drive 1 in FIG. 1. The tensioning rail 6 is integrally formed of a basic body 11, which, on a front of the basic body 11 facing the drive chain 4, has a sliding surface 12 contacting the drive chain 4 in a chain drive 1. On the back of the tensioning rail 6 facing away from the sliding surface 12, the basic body 11 has, at one end of the tensioning rail 6, provided therein a bearing reception 13, in which the bearing point 5 constituting an integral part of the engine is located, cf. FIG. 1, and which allows the tensioning rail 6 to be pivotably supported about the bearing point 5. The basic body 11 is provided with window openings 14 and trusslike stiffening members 15 so as to increase the stability of the basic body 11 while restricting the amount of material that has to be used. The spring unit 8 is connected to the basic body 11 of the tensioning rail 6 via the locking element 10. The wear protection element 9 positioned between the bolt-shaped counter bearing 7 and the spring unit 8 is arranged on the spring unit 8 via an additional locking element 16. On the side of the wear protection element 9 facing the counter bearing 7, a reception unit 17 having an approximately semicircular contact surface 18 is provided, the wear protection element 9 contacting the counter bearing 7 via most of the area of said contact surface 18 and distributing thus the force applied by the spring unit resting thereon.

Figure 3:
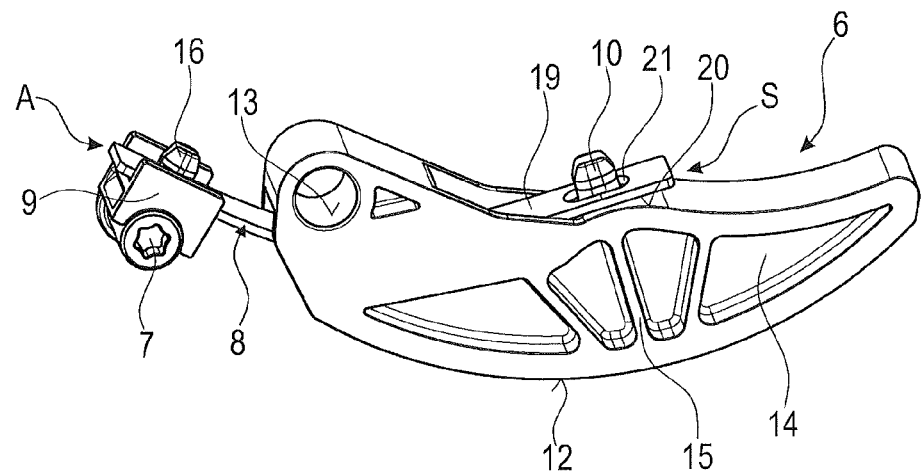
FIG. 3 shows a perspective view of the tensioning rail of FIG. 2 according to the present invention.

The perspective view of the tensioning rail 6 in FIG. 3 shows that the spring unit 8 is configured as a leaf spring 19 and that the leaf spring 19 is in contact with the press-on area or press-on surface 20 defined by the basic body 11, so as to transmit the pretension of the spring unit 8 via the basic body 11 to the sliding surface 12 and from there to the drive chain 4 in the tight span of the chain drive 1. For accommodating the locking element 10 protruding from the basic body 11 on the press-on surface 20, the leaf spring 19 has provided therein an elongate hole 21 guaranteeing a captively secured mode of arrangement of the leaf spring 19 on the basic body 11 of the tensioning rail 6 and, simultaneously, also a relative movement of the leaf spring 19 along the press-on surface 20 so as to compensate for changes in length of the leaf spring 19. The locking element 10 protruding from the basic body 11 on the press-on surface 20 is configured as a slotted detent pin allowing the leaf spring 19 to be clipped on easily via the elongate hole 21 provided on the tensioning end S. The detent head of the slotted detent pin prevents the spring unit 8 from loosening or getting lost unintentionally, whereas the elongate hole 21 formed in the longitudinal direction of the leaf spring 19 allows a movement of the leaf spring 19 relative to the press-on surface 20.

Figure 4A:
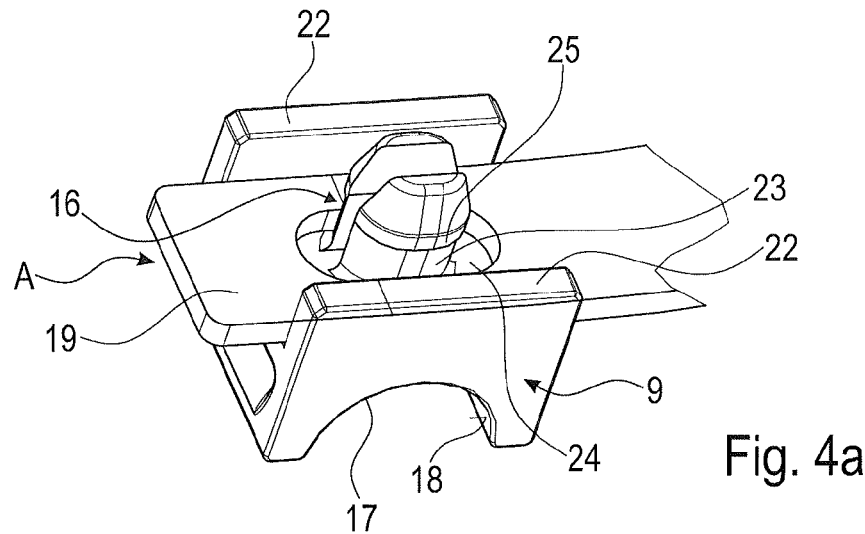
FIG. 4a shows a view of a detail of the wear protection element according to FIGS. 2 and 3.

FIG. 4a shows an enlarged fragmentary view of the wear protection element 9 arranged on the support end A of the spring unit 8. The wear protection element 9 comprises two lateral guide webs 22 between which the leaf spring 19 is laterally guided. The locking element 16 of the wear protection element 9 is configured as a slotted detent pin 23 extending through an elongate hole 24 on the support end A of the leaf spring 19, the detent head 25 of the detent pin 23 captively holding the leaf spring 19, when the latter has been clipped on, on the wear protection element 9, whereas the elongate hole 24 allows a movement of the leaf spring 19 relative to the wear protection element 9 in the longitudinal direction of the leaf spring 19. FIG. 4a additionally shows the semicircular reception unit 17 on the side of the wear protection element facing away from the leaf spring 19, the contact surface 18 of said reception unit 17 abutting on a complementarily shaped counter bearing 7 so as to support the spring unit 8.

Figure 4B:
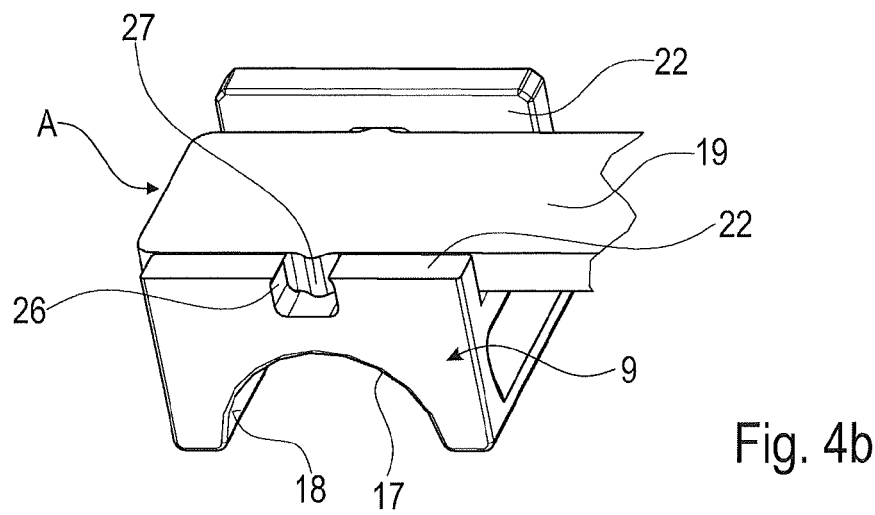
FIG. 4b shows another embodiment of the wear protection element and its fastening on the support end of the spring unit.

Another embodiment of the locking element 16 for arranging the wear protection element 9 on the support end A of the leaf spring 19 is shown in FIG. 4b. The wear protection element 9 is provided with respective openings 26 formed in the middle of the lateral guide webs 22 and engaged by a lateral projection 27 on the leaf spring 19. The lateral projection 27 is here shorter than the opening 26 in the longitudinal direction of the leaf spring 19, so as to allow a movement of the leaf spring 19 relative to the wear protection element 9. For mounting the wear protection element 9 at the support end A of the leaf spring 19, one of the lateral guide webs 22 of the embodiment shown in FIG. 4b is reduced in length, so that the opening 26 is open at the top. As soon as the wear protection element 9 has entered into contact with the counter bearing 7 via the contact surface 18 of the reception unit 17, a captive mode of arrangement of the wear protection element 9 on the leaf spring 19 is established in spite of an opening 26 that is open at the top.

Figure 4C:
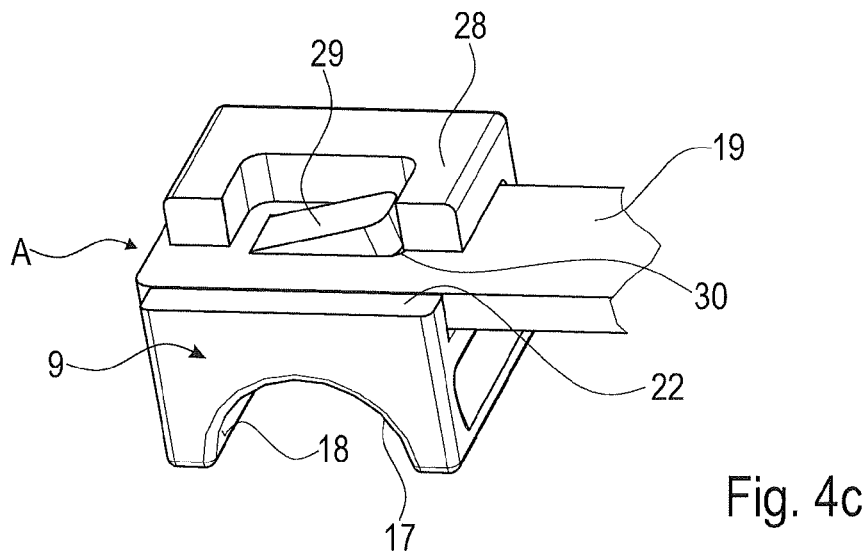
FIG. 4c shows a further embodiment of the wear protection element and its fastening on the support end of the spring unit.

FIG. 4c shows another embodiment of the locking element 16 for arranging the wear protection element 9 at the support end A of the leaf spring 19. The wear protection element 9 comprises here a lateral guide 22, which is essentially flush with the surface of the leaf spring 19, as well as a side part 28 partially covering the surface of the leaf spring 19. For fixing the wear protection element 9 on the leaf spring 19, a locking tongue 29 is provided, which resiliently projects from the wear protection element 9 and extends through an opening 30 in the leaf spring 19. In so doing, the locking tongue 29 securely fixes the wear protection element 9 at the support end A of the leaf spring 19.

Figure 5A:
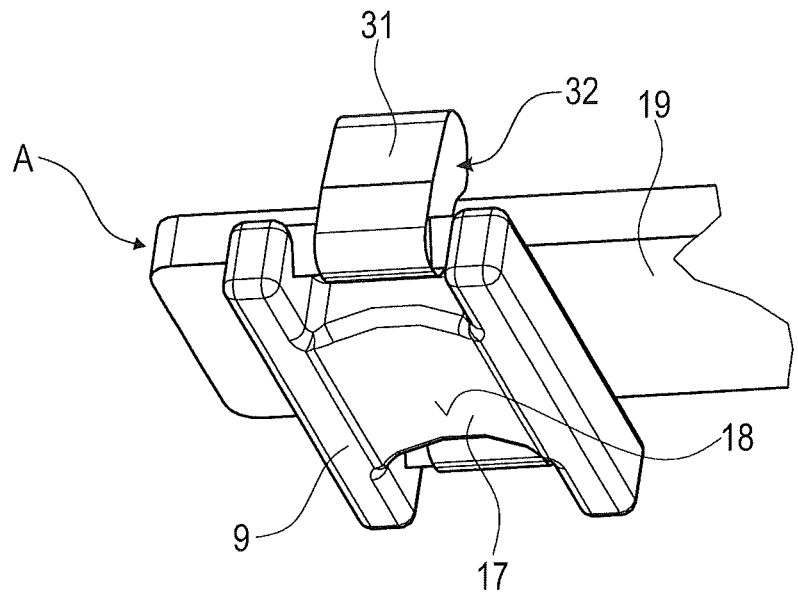
FIG. 5a shows a perspective bottom view of a flat embodiment of the wear protection element and its fastening on the support end of the spring unit.
Figure 5B:
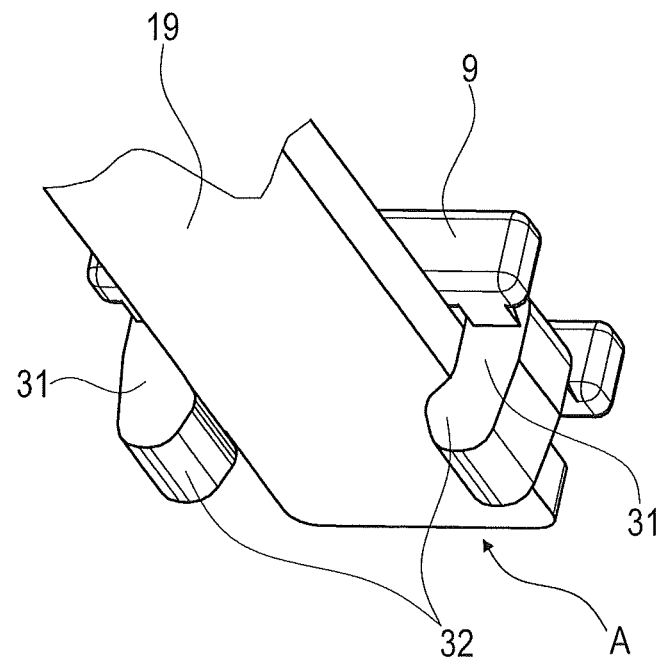
FIG. 5b shows a perspective view of the fastening of the wear protection element according to FIG. 5a, FIG. 5c shows a perspective bottom view of a further flat embodiment of the wear protection element and its fastening on the support end of the spring unit.

FIGS. 5a and 5b show various perspective views of a flat embodiment of the wear protection element 9. This wear protection element 9 comprises a flat reception unit 17 with a contact surface 18 curved slightly inwards for contact with a counter bearing 7, the shape of the counter bearing 7 corresponding preferably to the shape of the slightly concave contact surface 18. The wear protection element 9 has two locking legs 31 located laterally of the leaf spring 19, said locking legs 31 extending from the wear protection element 9 to the opposite side of the leaf spring 19, where they engage behind the surface of the leaf spring 19 by means of their detent projections 32. This has the effect that the wear protection element 9 is securely arranged at the support end A of the leaf spring 19, a relative movement between the wear protection element 9 and the leaf spring 19 in the longitudinal direction of the leaf spring 19 being nevertheless still possible, since the detent projections 32 of the locking legs 31 only engage behind the surface of the leaf spring 19, but do not engage openings that may optionally be provided.

Figure 5C:
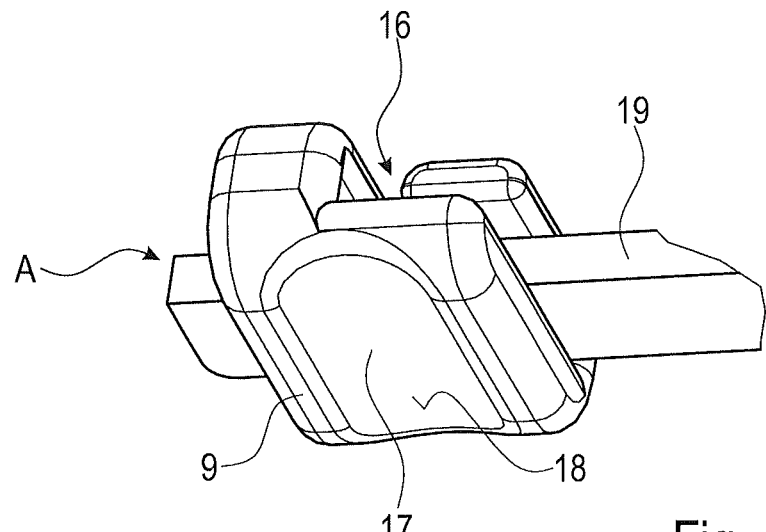
FIG. 5d shows a perspective view of the fastening of the wear protection element according to FIG. 5c.
Figure 5D:
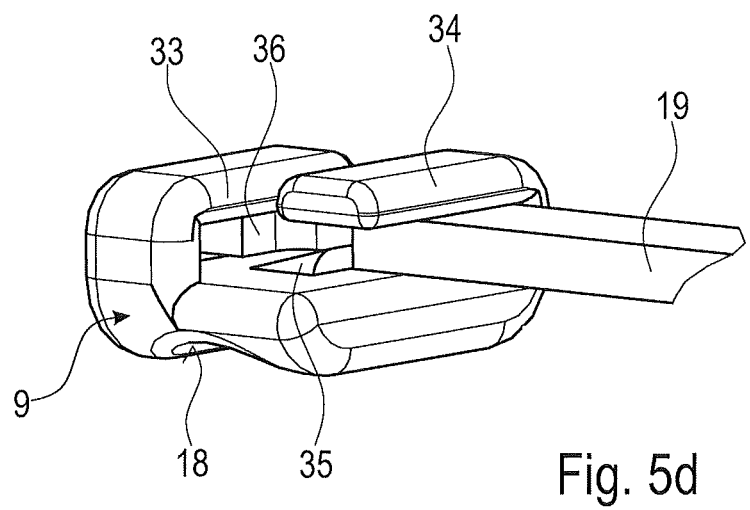

Another embodiment of a wear protection element 9 provided with a flat reception unit 17 is shown in FIGS. 5c and 5d. The perspective view in FIG. 5c shows the flat reception unit 17 with a slightly concave contact surface 18 for contact with a complementarily shaped counter bearing 7. The support end A of the leaf spring 19 extends through the wear protection element 9 and is fixed via the locking element 16 of the wear protection element 9. The leaf spring 19 extends here through a closed leg 33, which is provided on the side facing away from the reception unit 17, and a leg 34, which is open on one side thereof and which allows the leaf spring 19 to be mounted more easily. The legs 33, 34 have provided between them a locking projection 35 engaging a lateral opening 36 in the leaf spring 19 and preventing the wear protection element 9 from being pushed farther onto the leaf spring 19. The shape of the locking projection 35 and the size of the opening 36 allow, however, a relative movement of the wear protection element 9 in the direction of the support end A.

Figure 6:
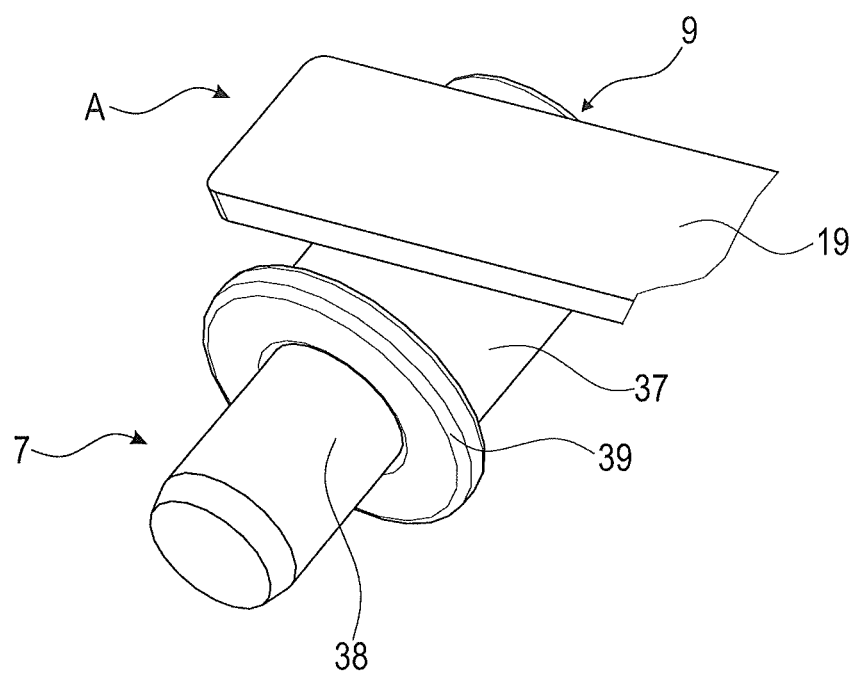
FIG. 6 shows a perspective view of a sleevelike embodiment of the wear protection element for arrangement on the counter bearing.

FIG. 6 shows a completely different arrangement of the wear protection element 9 between the spring unit 8 and the counter bearing 7. The wear protection element 9 is here configured as a wear protection sleeve 37 arranged on a counter-bearing pin 38. The wear protection sleeve 37 is provided with a lateral, circumferentially extending and projecting rim 39 securing the leaf spring 19 in position on the wear protection sleeve 37. Although the wear protection sleeve 37 is positioned on the counter-bearing pin 38, this embodiment allows a captive mode of arrangement of the wear protection element at the support end of the spring unit 8, provided that the tensioning rail 6, which is pivotable about a bearing point 5 that is fixedly arranged relative to the counter bearing 7, captively retains the leaf spring 19 on the press-on surface 20; a displaceability of the leaf spring 19 relative to the locking element 10 must here not exceed the size of the portion of the leaf spring 19 projecting from the wear protection sleeve 37.

For a tensioning rail 6 according to the present invention as shown in FIGS. 1 to 3, a one-piece basic body 11 including a sliding surface 12 for contact with a drive chain 4 is used, said basic body 11 being preferably produced from plastic material in an injection molding process. The leaf spring 19, which is made of spring steel, is clipped onto the locking element 10 on the press-on surface 20 of the basic body 11 and rests on the basic body 11 in the interior thereof in the area of the bearing reception 13, said leaf spring 19 being pretensioned via its contact with the counter bearing 7. Depending on the structural design of the wear protection element 9, the latter can subsequently be pushed on from the support end A of the leaf spring 19 and positioned between the counter bearing 7 and the leaf spring 19, or the wear protection element 9 is pushed onto the support end A of the leaf spring 19 before the tensioning rail 6 is mounted and is then positioned between the leaf spring 19 and the counter bearing 7 when the tensioning rail 6 is being mounted, so that the contact surface 18 of the reception unit 17 will abut on the counter bearing 7.

LIST OF REFERENCE NUMERALS 1 chain drive
2 driven gear
3 drive gear
4 drive chain
5 bearing point
6 tensioning rail
7 counter bearing
8 spring unit
9 wear protection element
10 locking element
11 basic body
12 sliding surface
13 bearing reception
14 window openings
15 stiffening members
16 locking element
17 reception unit
18 contact surface
19 leaf spring
20 press-on surface
21 elongate hole
22 guide webs
23 detent pin
24 elongate hole
25 detent head
26 opening
27 lateral projection
28 side part
29 locking tongue
30 opening
31 locking legs
32 detent projection
33 closed leg
34 open leg
35 locking projection
36 opening
37 wear protection sleeve
38 counter-bearing pin
39 rim
A support end
S tensioning end

The invention claimed is:

1. A tensioning rail for a drive chain comprising a basic body and a spring unit, the basic body including a sliding surface for contact with the drive chain and a press-on surface,
   wherein the spring unit is a leaf spring having a tensioning end arranged on the press-on surface and having a support end configured to be supported on a counter bearing,
   wherein a wear protection element is provided, said wear protection element being arranged at the support end of the spring unit.

2. The tensioning rail according to claim 1, wherein a locking element is provided on the press-on surface of the basic body.

3. The tensioning rail according to claim 1, wherein the wear protection element is made of a wear-resistant, low-friction plastic material.

4. The tensioning rail according to claim 1, wherein the wear protection element has a curved or semicircular contact surface.

5. The tensioning rail according to claim 1, wherein the wear protection element is provided with locking elements for fixing the wear protection element at the support end of the spring unit.

6. The tensioning rail according to claim 1, wherein the wear protection element is configured as a sleeve for arrangement on the counter bearing and for contact with the support end of the spring unit.

7. The tensioning rail according to claim 1, wherein fastening means are provided on the support end of the spring unit.

8. The tensioning rail according to claim 1, wherein the wear protection element includes two lateral guide webs to guide the spring unit in along a longitudinal direction of the spring unit.

9. The tensioning rail according to claim 1, wherein the wear protection element includes a detent pin for securing the support end of the leaf spring.

10. The tensioning rail according to claim 9, wherein the detent pin extends through a hole defined on the support end of the leaf spring.

11. The tensioning rail according to claim 9, wherein the detent pin is a slotted detent pin and includes a detent head.

12. The tensioning rail according to claim 1, wherein the wear protection element includes a reception unit defining a semicircular shaped contact surface configured to be contact the counter bearing.

13. The tensioning rail according to claim 1, further comprising two locking legs extending from the wear protection element away from the drive chain on opposites sides of the spring unit.

14. A chain drive of an internal combustion engine, comprising a drive gear and at least one driven gear, an articulated chain wrapped around the drive gear and the at least one driven gear, and a tensioning rail contacting the articulated chain, the tensioning rail comprising a basic body and a spring unit, the basic body including a sliding surface for contact with the articulated chain and a press-on surface, wherein the spring unit is a leaf spring having a tensioning end arranged on the press-on surface and having a support end configured to be supported on a counter bearing, wherein a wear protection element is provided at the support end of the spring unit.

15. The use of a tensioning rail, which comprises a basic body and a spring unit, for a chain drive of an internal combustion engine, wherein the spring unit is a leaf spring having a tensioning end arranged on a press-on surface of the basic body and having a support end configured to be supported on a counter bearing, and wherein a wear protection element is provided between the support end and the counter bearing during operation.

\* \* \* \* \*